United States Patent [19]

Bishop

[11] 4,020,489
[45] Apr. 26, 1977

[54] SEQUENTIAL OBSERVER MULTI-FUNCTIONAL FRIEND ACCEPT DECIDER

[75] Inventor: Walton B. Bishop, Oxon Hill, Md.

[73] Assignee: The United States of America as represented by the Secretary of the Navy, Washington, D.C.

[22] Filed: July 25, 1975

[21] Appl. No.: 599,203

[52] U.S. Cl. ......................................... 343/6.5 LC
[51] Int. Cl.² ........................................ G01S 9/56
[58] Field of Search .................... 343/6.5 R, 6.5 LC

[56] References Cited
UNITED STATES PATENTS 3,781,881  12/1973  Hovey .................... 343/6.5 LC Primary Examiner—T.H. Tubbesing
Attorney, Agent, or Firm—R. S. Sciascia; Philip Schneider; Norman Brown

[57] ABSTRACT

A Friend-Accept decision is made based upon the accumulated value of only a limited number of responses to interrogations. A correct reply causes the accumulated value to increase by a weighted value $U_a$, while other than a correct response causes the accumulated value to decrease by a weighted value $D_b$. A decision to accept as a "friend" occurs when the accumulated value reaches or exceeds a predetermined threshold $T_a$.

4 Claims, 2 Drawing Figures

SEQUENTIAL OBSERVER MULTI-FUNCTIONAL FRIEND ACCEPT DECIDER

BACKGROUND OF THE INVENTION

In a military environment, it is essential to determine whether an approaching aircraft or other vehicle is a friend or an enemy. This determination is generally accomplished by decision making apparatus called Identification-Friend-or-Foe (IFF) systems. In a typical IFF system an interrogating station transmits an interrogation signal to which a transponder in the approaching vehicle automatically replies with an answer or reply-signal. The interrogation and reply signals are generally coded in a cryptographic fashion according to needs of the situation and a correct reply to a given interrogtion is one that is coded in a predetermined manner.

Virtually every IFF system has as its fundamental element a Friend-Accept decider, also commonly known as a "Reply Evaluator." It is this Friend-Accept decider which determines whether a sufficient number of received correct reply-signals come from a friend or an enemy. An enemy may be attempting to guess the code, or repeat previously intercepted "friend" replies, or attempt to interfere with reception of replies transmitted by friends. Hopefully, a Friend-Accept decider will be able to detect these attempts and initiate appropriate action.

Many varieties of IFF systems are currently in use. Present day systems generally allow the enemy too much of a chance to be accepted as a friend, or are too vulnerable to disruptive interference or jamming (which can effectively deny acceptance by an IFF system of a true friend as a friend). One type of Friend-Accept decider utilizes a Friend-Accept decision criteria that accepts an approaching vehicle as a friend only when it responds with a series of correct replies to a predetermined number of interrogations. In other words, it examines a received set of responses for a "run" of a predetermined number of correct replies in succession.

One of the significant disadvantages of many previous systems is that an enemy, by simply increasing the reply signal power with respect to a "friend" (located the same distance from the IFF antenna) could increase the number of chances to transmit a proper reply signal (because the greater signal energy will then be received over a larger angular antenna scanning space as the antenna sweeps by the target vehicle). Also, in many previous systems, the enemy can deny a friendly vehicle acceptance as a friend by simply transmitting periodic jamming signals which interfere with reception of correct reply signals. This is because a run of correct replies could be interrupted by a jamming signal, and the system would then begin to look for a new set of correct replies.

Some other types of IFF systems utilize a sliding window technique in which an essentially unlimited number of samples are used in carrying out a continuous evaluation process to determine whether an unknown transponder is a friend or foe. The continuous sliding window evaluation process examines a predetermined number of the most recently received reply signals and determines the ratio of correct to incorrect replies. This process, too, is undesirable because it allows the enemy far too many chances to come up with a proper set of reply responses. Sliding window techniques generally require a higher threshold of acceptance for a given level of decision confidence than does a sliding window technique in which the total decision sample is bounded.

Still other techniques are available which may avoid some of the deficiencies described above, but they generally require a memory capability. The present invention does not.

The present invention makes use of the well known "Sequential Observer" technique to achieve, with a simpler device, the same or improved result as that achievable by more complicated devices. Although the sequential analysis technique itself was throughly described by A. Wald in 1947 ("Sequential Analysis" John Wiley and Sons, N.Y. 1947), it has not been previously applied in the manner of the present invention.

SUMMARY OF THE INVENTION

The present invention utilizes a "Sequential Observer" technique as a decision making procedure in a Friend-Accept determination. In this technique, a predetermined number (positive or negative) "Weight Value" is added to an accumulated sum each time a good reply to an interrogation is received, while a different predetermined number (positive or negative) "Weight Value" is added to the accumulated sum each time an incorrect response is received. A target is declared a "friend" if the accumulation of weighted values exceeds a threshold value in response to a specified number of interrogations during a reception period in which the reply signal is received with sufficient signal strength.

It is therefore an object of the present invention to determine whether the responses to IFF interrogations appear to come from a friendly target or not;

It is a further object of the present invention to utilize the "Sequential Observer" technique to determine if the responses to IFF interrogations appear to come from a friendly target or not;

It is still another object of the present invention, by resort to implementation of the "Sequential Observer" technique, to minimize the opportunity of an enemy target becoming accepted as a friend by guessing friendly replies;

Other objects, advantages and novel features of the invention will become apparent from the following detailed description of the invention when considered in conjunction with the accompanying drawings wherein:

DETAILED DESCRIPTION

Figure 1:
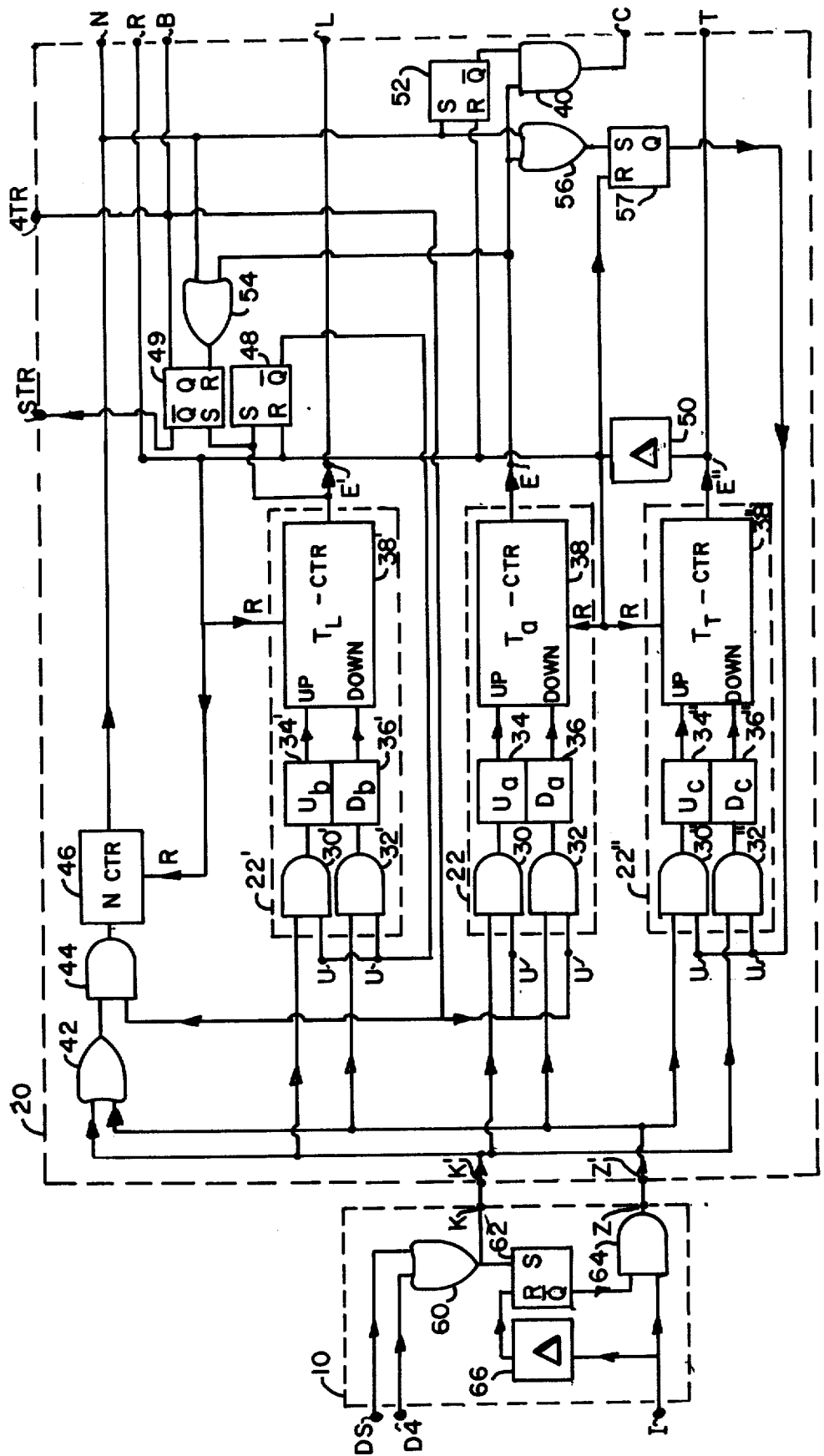
FIG. 1 depicts in schematic block diagram a preferred embodiment of the present invention.

Referring to FIG. 1, a Friend-Accept (F/A) interface device 10 has three input terminals DS, D4, and I, and has two output terminals K and Z which make available digital ones and zeroes respectively. A Friend-Accept decider (FAD) 20 has input terminals K', Z' connected to F/A interface output terminals K, Z respectively.

Friend-Accept decider 20 includes three essentially identically structured Algebraic Accumulator devices 22, 22', 22". The structure of each of the Algebraic Accumulator devices 22, 22', 22" will be described by reference to only one of these devices 22, with similar elements and connections being assumed present in the other devices 22', 22'' (indicated in FIG. 1 with corresponding prime (') and double prime ('') symbols). Accumulator 22 is comprised of two AND gates 30, 32, two multipliers 34, 36, and an Up-Down counter 38. The AND gate 30 has an input terminal connected to the K' digital "one" input terminal, and has an input enable terminal U. AND gate 32 has an input terminal connected to the Z' digital "zero" input terminal, and has an input enable terminal U. The first input terminal of AND devices 30'', 32, and 32' are connected to the Z' input terminal, and the first input terminal of AND devices 30, 30', and 32'' are connected to the K' input terminal. Multipliers 34, 36 have their input terminals respectively connected to the output terminals of AND gates 30, 32. Up-Down counter 38 has an Up-count input terminal connected to the output of multiplier 34, and a Down-count input terminal coupled to the output of multiplier 36. Counter 38 has a reset terminal R, and an output terminal E which carries the output of Accumulator 22.

Accumulator 22 has its output terminal E coupled through an AND device 40 to a FAD-20 output terminal C. Output terminal E' of Accumulator 22' is connected to a FAD-20 output terminal L. Accumulator 22'' has its output terminal E'' connected to a FAD-20 output terminal T.

An OR device 42 has its two input terminals connected to the K' and Z' FAD-20 input terminals. The output of OR device 42 is coupled through the input of an AND-device 44 to an N-counter device 46. The output of N-counter device 46 forms a FAD-20 output terminal N. N-counter 46 has a reset terminal R coupled to a FAD-20 reset terminal R.

Accumulator 22 output terminal E is also connected to an input terminal of an OR device 54, and to an input terminal of an OR device 56. The output terminal E' of Algebraic Accumulator 22' is also connected to the set terminal S of each of two flip-flop devices 48, 49. The output terminal E'' of Accumulator 22'' is connected through a Delay device 50 to FAD-20 output reset terminal R, to reset terminal R of flip-flop 48, to reset terminal R of a flip-flop device 52 and to the reset terminal of counter 38''. The complementary output terminal Q of flip-flop 52 is connected to the other input terminal of AND device 40.

The output terminal of N-counter 46 is also coupled to a second input terminal of OR device 56, to a set input terminal S of flip-flop 52, and to a second input terminal of OR device 54. The output terminal or OR device 56 is connected to the set terminal S of a flip-flop device 57. The output of delay device 50 is also coupled to the reset terminal of flip-flop 57, and reset terminal R of counter 38. The non-complementary output terminal Q of flip-flop 57 is connected to the input enable terminal U of each of AND devices 30'' and 32''.

The complementary output terminal Q of flip-flop device 48 is connected to input enable terminals U of AND devices 30' and 32'.

Flip-flop 49 has its complementary output terminal Q connected to a FAD-20 device output terminal STR, and has a reset terminal R connected to the output terminal of OR device 54. The non-complementary output Q of flip-flop 49 forms a FAD-20 output terminal B, to which another FAD-20 output terminal, denoted as 4 TR, is connected. Also coupled to the non-complementary terminal Q of flip-flop 49 is the second input terminal of AND 44, and the enable input terminals U of AND devices 30, 32.

Interface device 10 has an OR device 60 whose two inputs are connected respectively to input terminals DS and D4, and whose output terminal is connected to the set terminal S of a flip-flop device 62. Input terminal I is connected to a first input of an AND device 64 and also through a delay device 66 to the reset terminal R of flip-flop 62. The complementary output terminal Q of flip-flop 62 is connected to the second input terminal of AND device 64. The interface output terminals K, Z are connected respectively to the output of OR device 60 and AND device 64.

Figure 2:
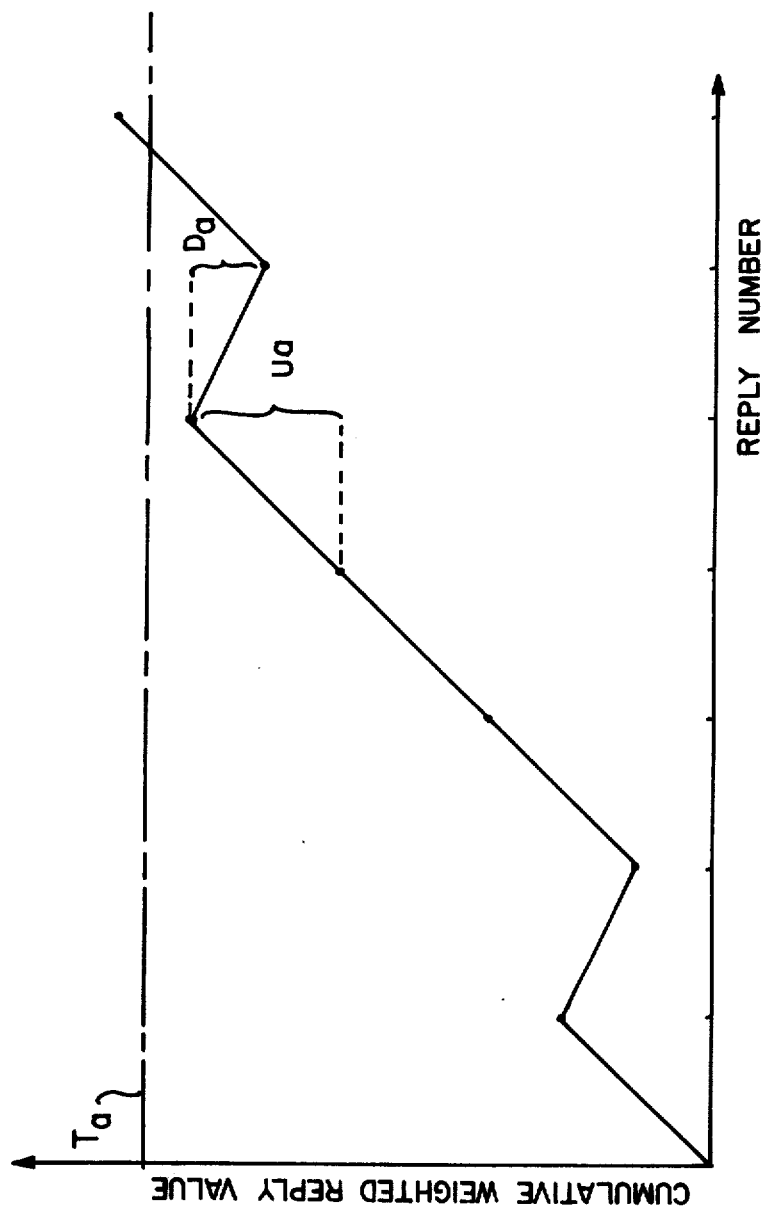
FIG. 2 depicts in pictorial fashion the Friend-Accept decisional procedure utilized in the preferred embodiment of the present invention.

FIG. 2 depicts a typical weighted reply-value accumulated in Friend-Accept counter 38 (as received replies are processed). The accumulated value is increased by $U_a$ upon receipt of each correct reply and decreased by $D_a$ for each interrogation not eliciting a correct reply. An "accepted as friend" decision is made when the accumulated value reaches the threshold value of $T_a$.

In operation, the F/A interface device 10 is utilized to receive signals from the receive-decode portion of an IFF system. These signals indicate a decoded correct reply (at DS or D4). An incorrect or non-responsive reply will cause no signal to be applied at any input terminal of F/A device 10. A correct reply may correspond to a valid "selective identification feature" (SIF) signal (commonly known as military modes I, II, and III and commercial/civilian modes A/C) indicated by a pulse at terminal DS, or a valid Mode IV reply indication signal (pulse at terminal D4). A pulse signal occurs after each interrogation, is delayed to allow all replies of interest to be decoded and is then applied to input terminal I. A correct IFF reply will produce a digital "one," while an incorrect or non-reply (which produces no indication signal) will produce a digital one at "zero" terminal Z as follows:

A pulse constituting the D4 or DS indication signal goes through OR 60 to set flip-flop 62. This pulse is also applied at interface output terminal K, and hence to AND gates 30, 30', 32'' and through OR gate 42 to AND 44. The first of such D4-DS signal pulses generated in response to a correct target reply will find only AND 30' open (and held open by the Q output signal from flip-flop 48). Each pulse that goes through AND 30' will cause the up-down counter 38' to count up $U_b$ units. In other words, multiplier 34' will multiply the digital "one" value by $U_b$ and cause the counter 38'' to increment by the amount $U_b$.

A determination of the "leading edge" of the target's reply signals—when reply signals are received with sufficient reliability to be properly processed—is accomplished in the following manner. When an interrogation is followed by either a D4 or DS indication signal pulse, then a delayed pulse on input I only acts to reset flip-flop 62 (after a slight delay produced by delay device 66). But, if there is no correct reply to an interrogation (and hence neither of the input signals D4, DS will be present) than a pulse signal I entering interface 10 will be able to go through AND 64 and AND 32' to multiplier 36' which will multiply its unity value by $D_b$. The multiplied product value will then be applied to counter 38' which will then count down $D_b$ units (but not past zero). Thus, each decoded correct reply on Mode IV or any SIF mode will cause counter 38' to count up $U_b$ units, while each time an interrogation fails to elicit a correct reply, counter 38' will count down $D_b$ units (as far as zero). This process continues until counter 38' reaches a count of $T_L$ (so termed for "Leading Edge Threshold").

When threshold $T_L$ is reached, counter 38' produces a pulse that provides a "leading edge" detection, or determination, signal at its output terminal E' and at FAD-20 output terminal L. This leading edge determination signal indicates when the strength of the received signal has increased by some specified amount (typically 3dB) from an initially received level. This determination signal pulse also sets flip-flop 48 and 49. Setting of flip-flop 49 removes an output signal from its complementary output terminal Q and produces an output signal at its non-complementary output terminal Q and thus at FAD-20 output terminal 4TR. These changed output signals may be utilized by the IFF system to effectuate a change in operation from an SIF mode to mode IV (if not already in mode IV); setting of flip-flop 49 also causes AND gates 44, 30, and 32 to open. The non-complementary output signal Q from flip-flop 49 also provides an output signal at terminal B, which signal may be utilized by the IFF system to initiate examination of the incoming signal for reply frequency interference or jamming. Setting of flip-flop 48 removes the voltage which kept AND gates 30' and 32' open.

After counter 38' reaches the $T_L$ threshold, each decoded valid reply will cause the Friend-Accept counter 38 to count up $U_a$ units; each interrogation that fails to elicit an acceptable reply from the target of interest will cause counter 38 to count down $D_a$ units. Also, since AND gate 44 was opened (by the leading edge declaration signal), N-counter 46 will count one unit for each interrogation signal transmitted, whether it elicits a target reply or not. This process continues until either counter 38 reaches a count of $T_a$ (the accept threshold), or N-counter 46 reaches a count of N.

If Friend-Accept counter 38 reaches the threshold $T_a$ before N-counter 46 reaches a count of N, the output pulse that counter 38 then produces will go through AND gate 40 to provide an output signal at output terminal C, which signal may be utilized by an associated IFF system to indicate that a Friend-Accept decision has been made; the counter 38 output signal will also go through OR gate 54 to reset flip-flop 49 (this reestablishes an SIF interrogation mode) whose non-complementary output signal Q is removed to close AND gates 44, 30, 32 to further passage of pulses. (Note that this action stops both N-counter 46 and Friend-Accept counter 38 from further counting).

The resetting of flip-flop 49 also terminates the voltage on output terminal B. The output signal from F/A counter 38 will also go through OR gate 56 to set flip-flop 57, thus opening AND gates 30" and 32" for receiving pulses from Friend-Accept decider input terminals Z', K' respectively.

If N-counter 46 reaches a count of N before Friend-Accept counter 38 reaches a count of $T_a$, then N-counter 46 produces an output pulse on output terminal N indicating that the predetermined number of interrogations have been transmitted without a sufficient number of acceptable replies. The output pulse from N-counter 46 also sets flip-flop 52 and removes the voltage previously applied by its Q output terminal so that any pulse thereafter produced by Friend-Accept counter 38 will be unable to pass AND gate 40. The pulse from N-counter 46 also goes through OR gate 54 to reset flip-flop 49, thus terminating the voltage on output terminal B (causing resumption of the SIF modes, and stopping any further inputs to N-counter 46 and Friend-Accept counter 38).

The trailing edge counter 38 starts receiving inputs as soon as either counter 38 reaches a count of $T_a$, or N-counter 46 reaches a count of N. Counter 38" counts up $U_c$ units each time a interrogation fails to elicit a reply (normally on SIG modes, however mode IV can be used as well) and it counts down $D_c$ units each time an interrogation does elicit an acceptable reply. When trailing edge counter 38" reaches a count of $T_T$, it produces an output pulse that provides the trailing edge declaration signal to output terminal T, and after a short delay produced by delay device 50, this pulse resets all counters to zero, resets those flip-flops that are not already in the reset position, and provides a reset pulse on output terminal R indicating that the signal being received and processed has become reduced in signal strength to a point at which further processing is undesirable.

The multipliers $U_a$, $D_a$ and the threshold $T_L$ can be selected so that the leading edges of the targets will be declared with desired accuracy. These thresholds are selected through resort to a simulation technique (i.e., "cut and try") often used to establish similar types of thresholds in similar types of equipment. Simulation may be carried out with the aid of simulation apparatus described in copending application Ser. No. 561,966 of Walton B. Bishop and John M. Hovey, entitled "Biased Bit Generator", now U.S. Pat. No. 3,961,169, issued 6/1/76 and in copending application Ser. No. 581,503 of Walton B. Bishop, entitled "SCAN SIMULATOR FOR SECONDARY RADAR/IFF TESTING", now U.S. Pat. No. 4,000,491 issued 12/28/76.

The ability to change $U_b$, $D_b$ and $T_L$ should be provided, since the need for an early or late declaration of leading edges will vary with the interrogation rates, antenna beam-width, and ranges involved.

It is also relatively easy to find, by a simulation procedure choices of $U_a$, $D_a$, and $T_a$ that will make the Friend-Accept counter 38 satisfy the mode IV "friend-rejection" criterion, and permit the "enemy-acceptance" criterion to be satisfied as well, if the total number of "spoofing opportunities" given to an enemy are limited (by means of an "unknown" decider, for example).

The trailing edge declaration provided by the present invention includes a very effecive anti-beam splitting technique. In this technique, since a trailing edge cannot be declared until either Friend-Accept counter 38 reaches a count of $T_a$ or N-counter 46 reaches a count of N, there is little chance that a new leading edge can be declared for any target after a trailing edge has been declared for a period equal to the time required for making an accept decision.

Under most conditions it is possible to satisfy all leading edge, Friend-Accept, and trailing edge criterion requirements with the embodiment of the invention as disclosed in the circuit of FIG. 1, while using $U_b = U_c$, and $D_b = D_c$, (that is, with the same up and down counts) if the thresholds $T_L$, $T_a$ and $T_T$ are carefully selected.

By choosing $U_a = 4$, $D_a = 1$, $T_a = 20$, and $N = 30$, then for a normally expected friend's "round reliability" and an enemy's "guessability," then the probability of acceptance of a friend as one is found to be 0.999, while the probability of acceptance of an enemy as a friend is 0.00005. Also, it is readily determined by simulation techniques referred to above (or by calculation) that letting $U_b = U_c = 2$, $D_b = D_c = 1$, and $T_L = T_T = 10$ gives a leading edge and trailing edge detection capability approximately equal to that of similar devices which make use of runs of successes or runs of failures for edge detection SEMIAUTOMATIC DECIDER. The trailing edge detection will be better than that of the SAJAC system however, because this detection process will not start until either $T_a$ or a count of N is reached.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for making a Friend-Accept decision determining whether a set of replies to valid interrogations from an Identification Friend-or-Foe system emanate from a friend or enemy, comprising:
    adding a predetermined number $U_a$ to an accept-decision sum each time a correct reply is received;
    subtracting a predetermined number $D_a$ from said accept-decision sum each time other than a correct reply is received;
    counting the number of interrogations made;
    deciding that replies examined emanate from a friend whenever said accept-decision sum becomes equal to or greater than a predetermined threshold value $T_a$ if said number of interrogations counted is less than a predetermined number N; and
    deciding that replies examined do not emanate from a friend whenever said number of interrogations counted is equal to or greater than a predetermined number N is said accept-decision sum has not become equal to or greater than an predetermined threshold value $T_a$.

2. The method of claim 1 for deciding whether replies emanate from a friend or enemy, further comprising the steps of:
    inhibiting accumulation of said accept-decision sum until deciding that replies examined are of sufficient signal strength for subsequent signals to be further processed;
    adding a predetermined number $U_b$ to a leading-edge decision sum to be accumulated each time a correct reply is noted;
    subtracting a predetermined number $D_b$ from said leading-edge decision sum each time other than a corect reply is noted;
    deciding that replies examined are of sufficient signal strength for subsequent signals to be further processed when said leading-edge decision sum becomes equal to or greater than a predetermined threshold value $T_L$;
    adding a predetermined number $D_c$ to a trailing-edge decision sum each time a valid reply is noted;
    subtracting a predetermined number $U_c$ from said trailing-edge decision sum each time other than a correct reply is noted;
    deciding that replies examined are no longer of sufficient signal strength for subsequent signals to be further processed when said trailing-edge decision sum becomes equal to or greater than a predetermined threshold value $T_T$;
    inhibiting accumulation of said trailing-edge decision sum until said number of interrogations counted is equal to or greater than said predetermined number N or said accept-decision sum becomes equal to or greater than said predetermined threshold value $T_a$.

3. A Friend-Accept decision making system for determining whether a set of replies to valid interrogations from an Identification-Friend-or-Foe system emanate from a friend or enemy, comprising:
    first means for generating, upon receipt of a correct reply in response to an interrogation, a first digital signal having a value of one;
    second means for generating, upon receipt of other than a correct reply in response to an interrogation, a second digital signal having a value of one;
    means coupled to said first and second signal-generating means for counting the number of interrogations transmitted and for producing an N-count signal upon counting a predetermined number N of interrogations;
    first multiplying means coupled to said first signal-generating means for forming a first product by multiplying said first signal by a predetermined weighting value $U_a$;
    second multiplying means coupled to said second signal-generating means for forming a second product by multiplying said second signal by predetermined weighting value $D_a$;
    means coupled to said first and second multiplying means for accumulating an accept decision sum, said accept decision sum comprising said first products from which are subtracted said second products; and
    means coupled to the outputs of said accept-decision sum-accumulating means and said counting means for generating a "Friend-Accept" indication signal whenever said accumulated accept decision sum becomes equal to or greater than a predetermined threshold value $T_a$ before said counting means produces said N-count signal, and for producing a "not-accept" indication signal whenever said N-count signal occurs before said accumulated accept decision sum becomes equal to or greater than said predetermined threshold value $T_a$.

4. The Friend-Accept decision making system of claim 3 further comprising:
    third multiplying means coupled to said first signal-generating means for forming a third product by multiplying said first signal by a predetermined weighting value $U_b$;
    fourth multiplying means coupled to said second signal-generating means for forming a fourth product by multiplying said second signal by a predetermined weighting value $D_b$;
    means coupled to said third and fourth multiplying means for accumulating a leading-edge decision sum, said leading-edge decision sum comprising said third products from which are subtracted said fourth products, and for generating a "Leading-edge determination" signal whenever said leading-edge decision sum becomes equal to or greater than a predetermined threshold value $T_L$;
    means coupled to the output of said leading-edge determination means for activating said means for accumulating an accept decision sum until said leading-edge determination signal is produced;

fifth multiplying means coupled to said first signal-generating means for forming a fifth product by multiplying said first signal by a predetermined weighting value $D_c$;

sixth multiplying means coupled to said second signal-generating means for forming a sixth product by multiplying said second signal by a predetermined weighting value $U_c$;

means coupled to said fifth and sixth multiplying means for accumulating a trailing-edge decision sum, said trailing edge comprising said fifth products from which are subtracted said sixth products, and for generating a trailing-edge determination signal whenever said trailing-edge decision sum becomes equal to or greater than a predetermined threshold value $T_T$.

* * * * *